W. E. WHITE.
GATE.
APPLICATION FILED MAR. 28, 1917.
1,352,233.
Patented Sept. 7, 1920.
2 SHEETS—SHEET 1.
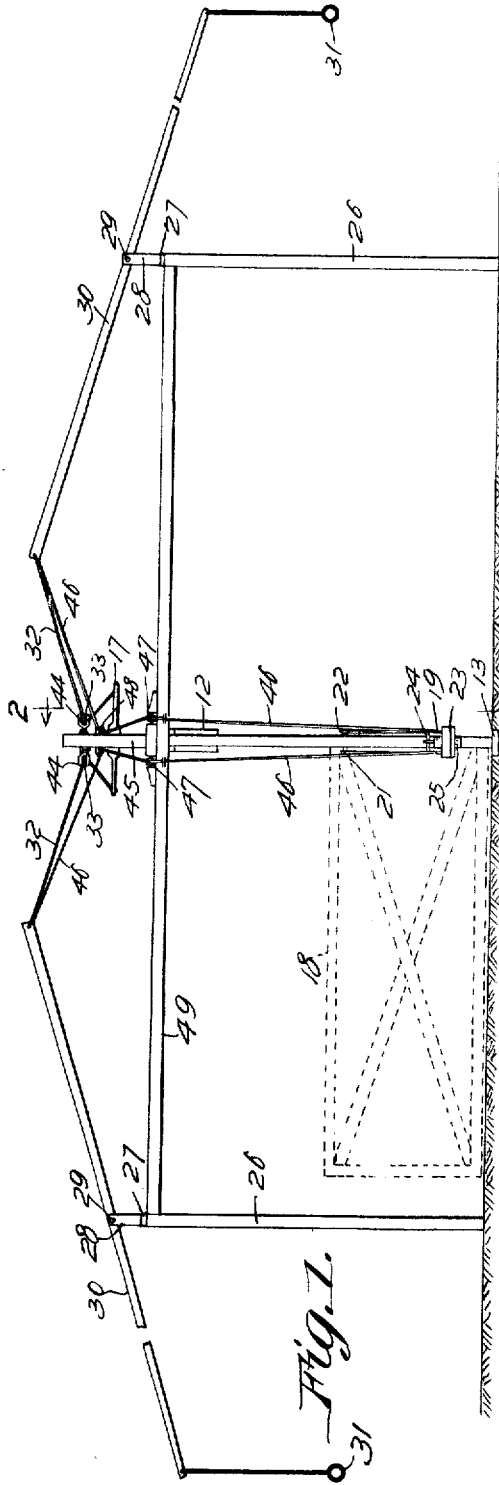
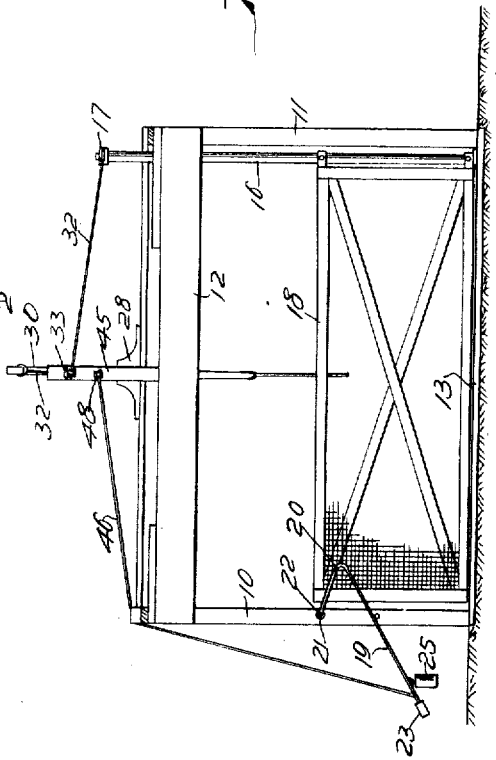
Inventor
William E. White,
By
Talbert & Parker
Attorneys

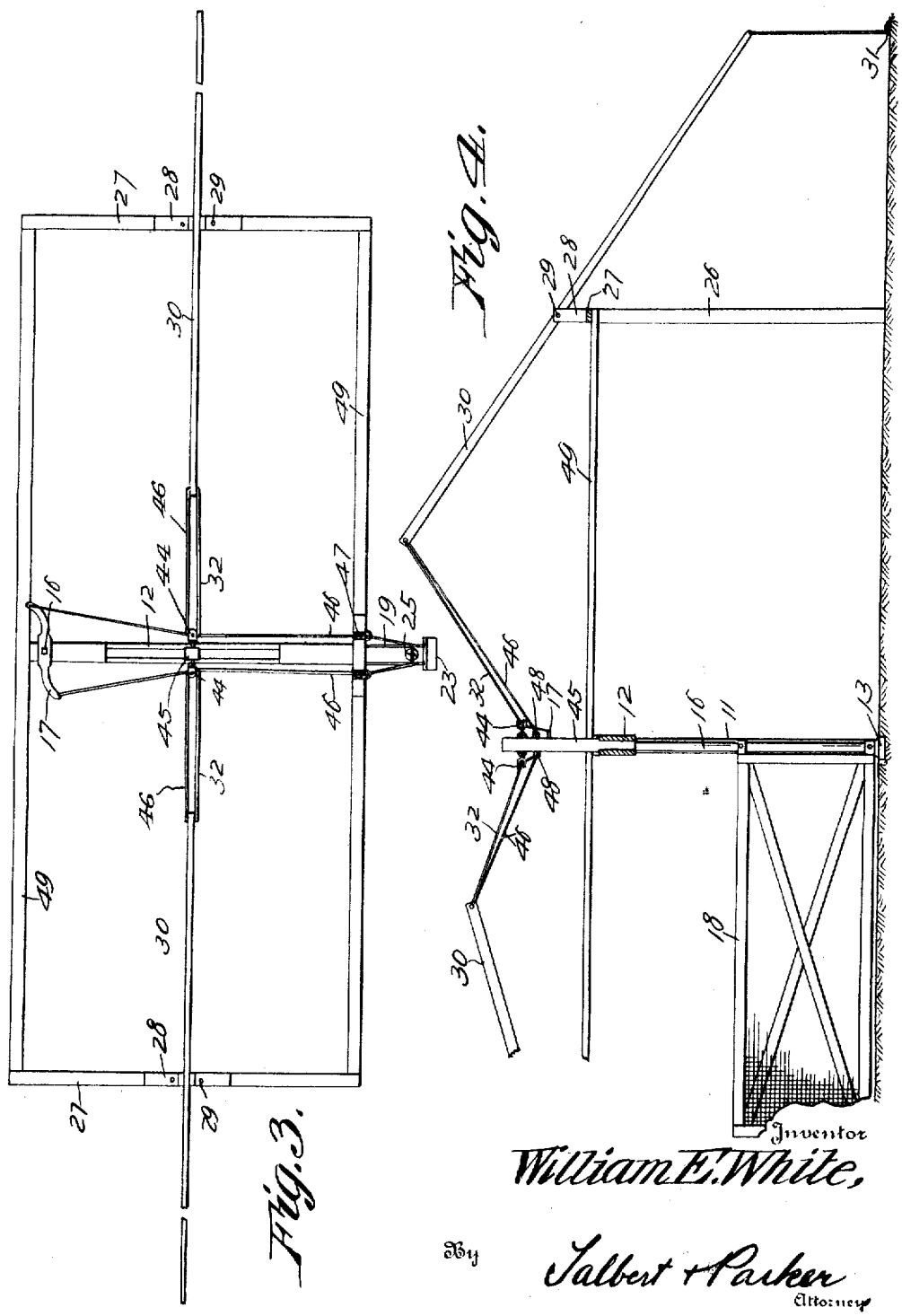

UNITED STATES PATENT OFFICE.

WILLIAM EUGIN WHITE, OF MANOR, TEXAS.

GATE.

1,352,233.　　　Specification of Letters Patent.　　Patented Sept. 7, 1920.

Application filed March 28, 1917. Serial No. 157,977.

*To all whom it may concern:*

Be it known that I, WILLIAM EUGIN WHITE, a citizen of the United States, residing at Manor, in the county of Travis and State of Texas, have invented certain useful Improvements in Gates, of which the following is a specification, reference being had therein to the accompanying drawing.

The present invention relates to gates, and has more particular reference to a gate and an operating mechanism therefor adapted to be manually controlled in approaching and leaving the gate to open and close the same.

It is an object of the present invention to provide a gate structure of this nature which is simple in construction, which may be easily and economically erected, and one which may be operated without the exercise of skill or of undue amount of pressure on the operating levers.

The invention still further aims at the provision of an improved latch for holding the gate in closed position, and which may be readily actuated for releasing and for securing the gate.

The above, and other objects and advantages of this invention, will be more particularly brought out in the following detailed description of the present preferred embodiment of this invention, the same being illustrated in the accompanying drawings, wherein;

Figure 1 is a side elevation of the gate and its mechanism;

Fig. 2 is a transverse section through the same on the line 2—2 of Fig. 1, looking in the direction of the arrows and showing the gate latched.

Fig. 3 is a top plan view of the gate and its operating mechanism, parts of the mechanism being shown in section.

Fig. 4 is a longitudinal section taken centrally through the gate mechanism, showing the gate in open position.

Referring to these drawings, wherein like parts are designated by similar numerals of reference throughout the several views, 10 and 11 designate spaced-apart gateposts, post 11 being preferably the hinged post, or the post arranged at the fixed end of the gate. A cross piece 12 joins the upper end of the posts 10 and 11 to brace the same and provide a substantial gate-inclosing frame. A base 13 joins the lower ends of the posts 10 and 11 and provides a pivotal support for a rotating hinge-stile 16 forming the inner end of the gate, the stile 16 being preferably in the form of a shaft which projects upwardly through, and has bearing in the cross piece 12.

A cross arm 17 is fixed upon the upper end of the stile 16 and, when the gate 18 is in closed position, extends longitudinally of the gate-operating structure. The gate 18 may be of any approved form and extends, when closed, to a point adjacent to the latch post 10. The latch post 10 is provided with a latch 19, the same comprising a pair of bars arranged in substantially parallel relation and having their inner ends bent abruptly upward at acute angles to provide a double latch nose 20 for engagement against the opposite sides of the gate 18 to hold the latter from swinging in either direction. The upturned ends of the arms are rolled over at their upper ends to provide pivot eyes 21 through which a pivot pin 22 is adapted to pass for rigidly supporting the arms 19. The pin 22 is secured through the latch post 10 and the eyes 21 are mounted upon the opposite ends of the pin. The outer extremities of the arms 19 are preferably connected together by a block or cross piece 23, and which may be further joined together by a shiftable transverse bar 24 adapted to be moved longitudinally on the arms 19 toward and from the block 23. A weight 25 is suitably suspended upon the bar 24 for yieldingly holding the latch 19 in depressed position, and in engagement with the gate 18.

The invention provides improved means for first operating the latch 19 to release it from the gate, and to subsequently swing the gate 18 in the desired direction. This means comprises pairs of posts 26 arranged at the opposite sides of the gate frame and being connected together at their upper ends by cross bars 27. Each cross bar 27 carries intermediate its ends an upwardly opening fork 28 in which is pivotally mounted, on a pin 29, an operating lever 30, the long arm of the lever projecting outwardly from the fork 28 away from the gate 18.

The outer end of each lever 30 is provided with a depending preferably flexible member carrying a handle 31 upon its lower end in easy reach of a person approaching either side of the gate 18. The inner end or short arm of each lever 30 is provided with a cable 32 which is extended inwardly toward the cross piece 12 of the gate frame and is carried over a pulley 33 mounted in a block 44 supported at the side of a standard 45 which projects upwardly from an intermediate portion of the brace 12. The cable 32 is carried laterally from the pulley 33 and is secured to the adjacent end of the cross arm 17. Thus, one lever 30 is connected to one end of the cross arm 17, and the opposite lever 30 is connected to the opposite end of said cross arm.

The latch 19 is provided with a pair of cables 46 which extend upwardly from the outer end of the latch and pass over rollers 47 mounted upon the upper end of the post 10, the cables 46 being carried inwardly to the standard 45 and passing over pulleys 48 mounted in the blocks 44. The cables 46 are secured at their opposite ends to the ends of the cables 32 and each pair of cables consisting of a cable 32 and a cable 46 has a sliding engagement with that end of the lever 30 with which they connect.

If desired, the supporting frames for the levers 30 may be connected to the gate frame by longitudinally extending beams 49 to provide a substantially rigid structure.

In the operation of the invention, when a person approaches one side of the gate 18 and desires to pass through the gate it is only necessary for the person to grasp the handle 31 on that side of the gate and to pull down upon the same. This swings the inner end of the lever 30 upward and creates tension on both the cables 46 and 32. The tension on the cable 32 tends to open the gate and the tension on the cable 46 tends to raise the latch 19. The gate, however, cannot be opened because of the obstruction interposed by the latch. Therefore, if the downward pull on the handle 31 is continued the cable 46 will slide through the end of the lever 30, thus increasing the length of the cable 32 to compensate the same for the raising of the lever. But such movement of the cable 46 shortens the latter with the upward movement of the lever 30 with the result that the latch 19 is raised until its nose 20 is freed from the gate and contacts with the stop pin set in the post 10. Thereafter the cables slide in the opposite direction through the lever 30, the cable 46 lengthening and the cable 32 shortening and the gate being swung to the open position. After the person has passed through the gate, he may then close the same by the lever and handle on the opposite side, the pulling down of the handle on that side of the gate affecting the reverse of the operation recited above for the opening of the gate.

Having thus described my invention, what I claim is:

In a gate, the combination with a gate frame of a rotatable hinge stile pivoted vertically in the frame and carrying a cross arm at its upper end, a gate carried by said hinge stile, a lever vertically mounted at one side of the gate frame, a latch carried by the gate frame for engagement with the gate, and a cable connected with the latch and passing to the lever and from the said lever to the cross arm, the said cable having a sliding engagement with the lever whereby in the opening of the gate the latch is caused first to disengage the gate and the gate thereafter swung to open position.

In testimony whereof I hereby affix my signature.

WILLIAM EUGIN WHITE.